United States Patent
Varlamov et al.

(10) Patent No.: US 10,042,439 B2
(45) Date of Patent: Aug. 7, 2018

(54) INTERACTIVE STYLUS AND DISPLAY DEVICE

(71) Applicant: Microsoft Technology Licensing, LLC, Redmond, WA (US)

(72) Inventors: Denis Varlamov, Portland, OR (US); Jonathan Westhues, Portland, OR (US)

(73) Assignee: MICROSFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/567,856

(22) Filed: Dec. 11, 2014

(65) Prior Publication Data

US 2016/0170504 A1     Jun. 16, 2016

(51) Int. Cl.
  *G06F 3/0354*   (2013.01)
  *G06F 3/01*     (2006.01)
  *G06F 3/044*    (2006.01)

(52) U.S. Cl.
  CPC .......... *G06F 3/03545* (2013.01); *G06F 3/016* (2013.01); *G06F 3/044* (2013.01)

(58) Field of Classification Search
  CPC ............. G06F 3/03545; G06F 3/04883; G06F 3/0317; G06F 1/1626
  See application file for complete search history.

(56) References Cited

U.S. PATENT DOCUMENTS

| | | | |
|---|---|---|---|
| 5,793,360 A * | 8/1998 | Fleck et al. | 345/179 |
| 8,610,744 B2 | 12/2013 | Harris | |
| 8,612,856 B2 | 12/2013 | Hotelling et al. | |
| 8,878,823 B1 * | 11/2014 | Kremin et al. | 345/179 |
| 2003/0174121 A1 * | 9/2003 | Poupyrev et al. | 345/156 |
| 2006/0012577 A1 | 1/2006 | Kyrola | |
| 2009/0153525 A1 * | 6/2009 | Chang | 345/179 |
| 2009/0265670 A1 * | 10/2009 | Kim et al. | 715/863 |
| 2009/0277697 A1 * | 11/2009 | Bolt | G06F 3/03545 178/19.01 |
| 2012/0331546 A1 * | 12/2012 | Falkenburg et al. | 726/16 |
| 2013/0106777 A1 | 5/2013 | Yilmaz et al. | |

(Continued)

FOREIGN PATENT DOCUMENTS

WO   2012123951 A2   9/2012

OTHER PUBLICATIONS

"How Can I Get Windows 8 to Automatically Disable Touch When I am Using my Wacom Pen and Turn it back on", Published on: Feb. 7, 2013, 2 pages.

(Continued)

*Primary Examiner* — Md Saiful A Siddiqui
(74) *Attorney, Agent, or Firm* — Alleman Hall Creasman & Tuttle LLP

(57) ABSTRACT

An interactive stylus for use with an interactive display device is provided. The interactive stylus includes a stylus body having a first end, where the first end is configured to be used by a user to provide a first function and a second function. The interactive stylus further includes a controller configured to cause the first end to be driven so as to capacitively couple the first end with an electrode matrix of the interactive display device, where such capacitive coupling is associated with the first function, and where the second function is disabled in response to automatically sensing, without explicit user input, a user's intent to use the first function.

20 Claims, 4 Drawing Sheets

(56) References Cited

U.S. PATENT DOCUMENTS

| | | | |
|---|---|---|---|
| 2013/0120281 A1* | 5/2013 | Harris | G06F 3/04883 345/173 |
| 2013/0229391 A1 | 9/2013 | DiVerdi | |
| 2014/0002422 A1* | 1/2014 | Stern | G06F 3/03545 345/179 |
| 2014/0028577 A1* | 1/2014 | Krah | G06F 3/0416 345/173 |
| 2014/0055427 A1* | 2/2014 | Kim | G06F 3/03545 345/179 |
| 2014/0078109 A1* | 3/2014 | Armstrong-Muntner | 345/175 |
| 2014/0125606 A1 | 5/2014 | Namkung | |
| 2014/0253465 A1 | 9/2014 | Hicks et al. | |
| 2014/0258901 A1 | 9/2014 | Cho | |
| 2015/0070330 A1* | 3/2015 | Stern | G06F 3/03545 345/179 |
| 2015/0370352 A1* | 12/2015 | Michihata | G06F 3/03545 345/173 |

OTHER PUBLICATIONS

Graziano, Dan, "Make sure you're using the S Pen correctly", Published on: Oct. 3, 2013, Available at: http://www.cnet.com/how-to/make-sure-youre-using-the-s-pen-correctly/.

Petrovan, Bogdan, "Master the S Pen on the Note 3: Feature Focus", Published on: Oct. 11, 2013, Available at: http://www.androidauthority.com/how-to-use-s-pen-note-3-282380/.

Hutterer, Peter, "Stylus Behaviour on Microsoft Surface 3 tablets", Published on: Sep. 22, 2014, Available at: http://who-t.blogspot.in/2014/09/stylus-behaviour-on-microsoft-surface-3.html?m=1.

Grossman, et al., "Hover Widgets: Using the Tracking State to Extend the Capabilities of Pen-Operated Devices", In Proceedings of the SIGCHI Conference on Human Factors in Computing Systems, Apr. 22, 2006, pp. 861-870.

ISA European Patent Office, International Search Report and Written Opinion Issued in Application No. PCT/US2015/062879, dated Mar. 8, 2016, WIPO, 15 Pages.

IPEA European Patent Office, Second Written Opinion Issued in PCT Application No. PCT/US2015/062879, dated Nov. 11, 2016, WIPO, 8 Pages.

* cited by examiner

INTERACTIVE STYLUS AND DISPLAY DEVICE

BACKGROUND

Interactive touch sensitive displays are used in a wide array of computing devices. In some cases, it is desirable to employ a stylus in addition to finger touch sensing in order to provide additional functionality. Options for additional functionality may be further enhanced via an active stylus employing a power source, storage, processor, radio transceiver, etc.

Interactive styluses used with touch sensitive displays may provide multiple functions such as drawing functions, erase functions, application launch functions, and/or other command functions. For instance, some styluses include an ink tip on one end and an eraser tip on another end. Alternative stylus designs can include an ink tip on one end and an actuator (e.g., a button) on the other end to perform a command, such as launching an application. In this type of stylus, each of the ends is typically constrained to provide only a single function, thereby limiting the functionality of the stylus.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In one approach, an interactive stylus is provided. The interactive stylus includes a stylus body having a first end, where the first end is configured to be used by a user to provide a first function and a second function. The interactive stylus further includes a controller configured to cause the first end to be driven so as to capacitively couple the first end with an electrode matrix of the interactive display device, where such capacitive coupling is associated with the first function, and where the second function is disabled in response to automatically sensing, without explicit user input, a user's intent to use the first function. In this way, one end of the interactive stylus can provide dual functions with intelligent and automated selection of the appropriate function, thereby enhancing interaction with the interactive display. Furthermore, disabling the second function while the first function is in use can prevent unintended execution of the second function during use of the first function, further improving stylus operation.

DETAILED DESCRIPTION

Figure 1:
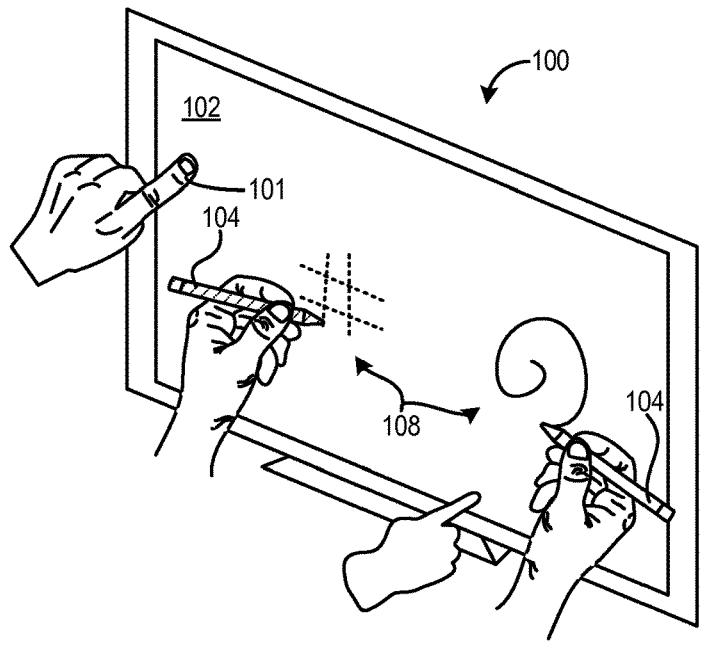
FIG. 1 is a schematic view of an exemplary interactive display system in accordance with an embodiment of the present disclosure.

FIG. 1 depicts an exemplary interactive display system 100 in accordance with an embodiment of the present disclosure. Interactive display system 100 includes an interactive display device 102 configured to concurrently sense input from multiple sources. For example, interactive display device 102 may sense touch input applied by human digits 101, as well as input applied by one or more input devices. The input devices may be in the form of styluses 104, or may be configured in another suitable form factor. As shown and described in more detail below, appropriate graphical output 108 may be generated and displayed in response to receiving input at interactive display device 102.

Figure 2:
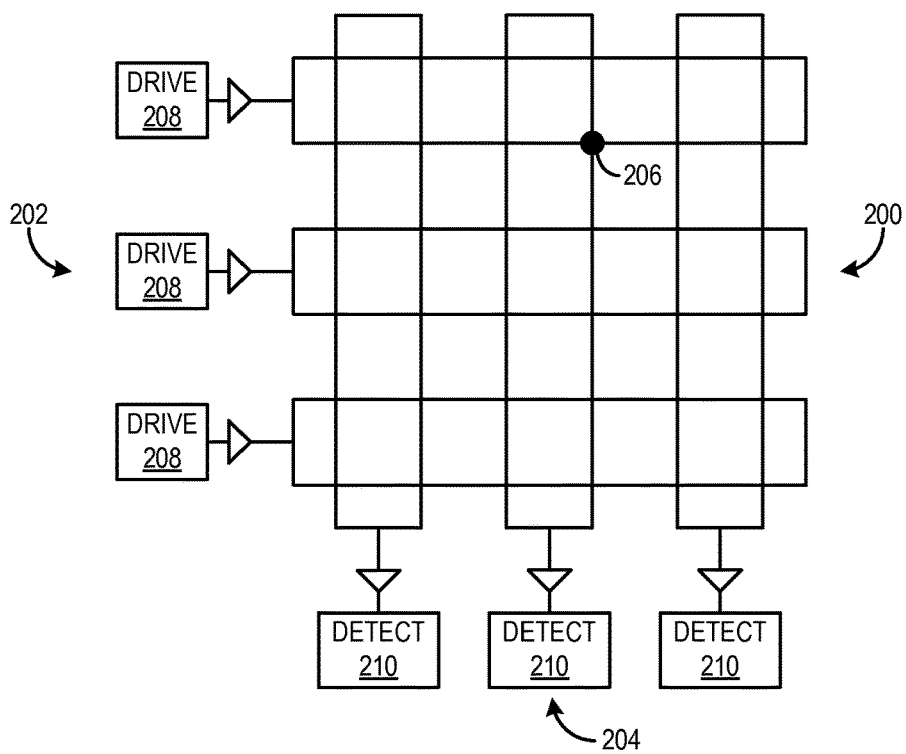
FIG. 2 is a schematic view of an electrode matrix of the interactive display system of FIG. 1.

FIG. 2 schematically shows an exemplary electrode matrix 200 that may be included in the interactive display system 100 to facilitate input detection and provide other functionality. Matrix 200 includes a plurality of row electrodes 202 and a plurality of column electrodes 204. The row and column electrodes are electrically separated from one another and form nodes (e.g., node 206) whose electrical properties (e.g., capacitance) may be monitored to detect touch input and stylus input.

The plurality of row electrodes 202 may be electrically coupled to respective drive circuits 208 configured to drive the row electrodes in various ways. The plurality of column electrodes 204 may be electrically coupled to respective detect circuits 210 which may detect currents and/or voltages in the column electrodes resulting from the driving of the plurality of row electrodes 202, the application of voltages to interactive display device 102 by styluses 104, and/or the touch of digit 101 to the display. Alternatively, detect circuits 210 may instead be coupled to the plurality of row electrodes 202, with the plurality of column electrodes 204 being driven by drive circuits 208. The electrode matrix so constructed may be used to detect not only touch inputs from the digit of a user, but also to ascertain at least one coordinate of the position of an input device, such as the stylus 104. It will be appreciated that the number of rows and columns shown in FIG. 2 is for illustrative purposes only, and that in a typical display many more columns and rows are included in matrix 200 than are illustrated in FIG. 2.

Figure 3:
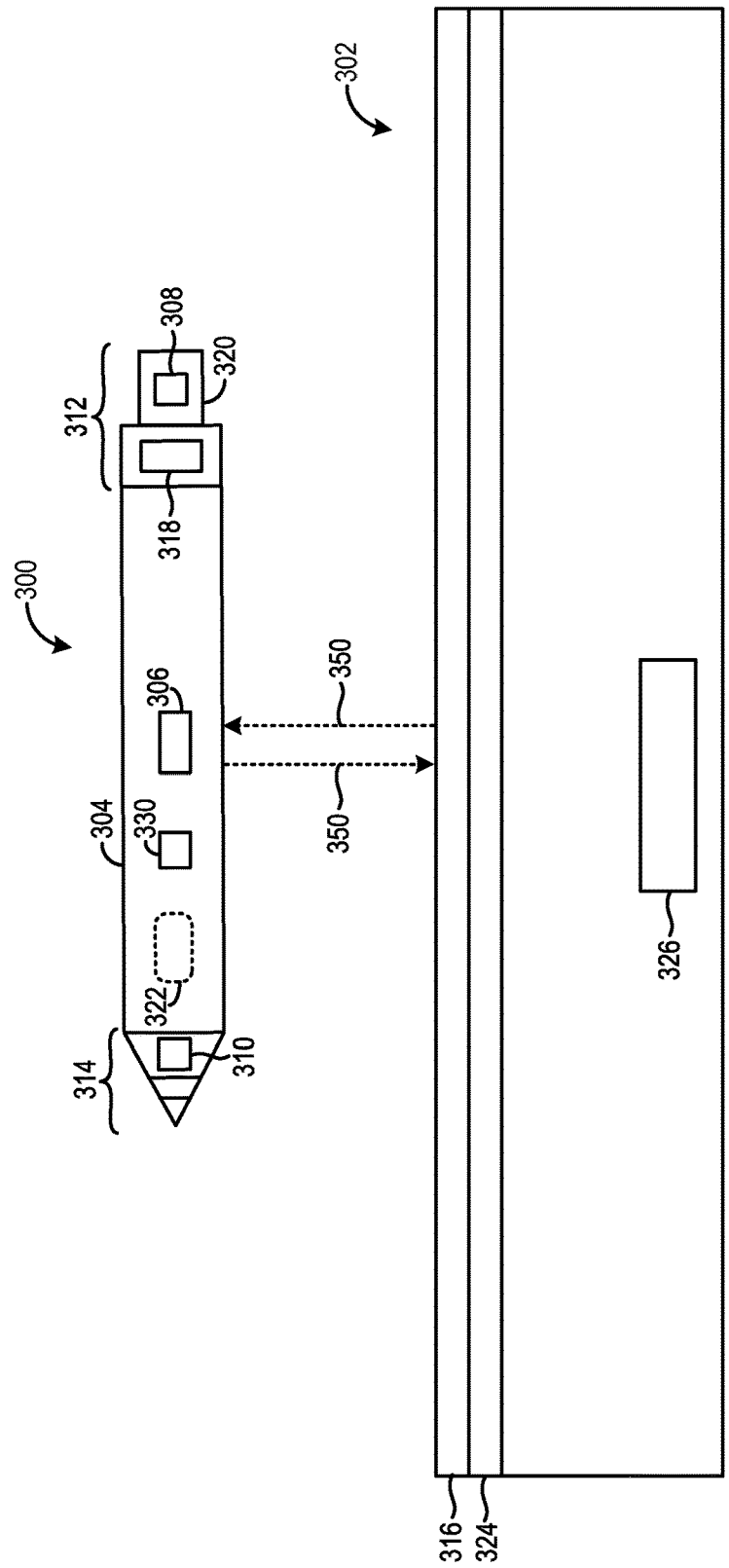
FIG. 3 depicts an exemplary interactive stylus and interactive display device that may be included in the interactive display system shown in FIG. 1.

FIG. 3 shows an example interactive stylus 300 for use with an interactive display device 302. Stylus 300 and interactive display device 302 are example implementations of interactive stylus 104 and interactive display device 102. Stylus 300 may be configured to trigger various functions in display device 302 such as drawing, erasing, application launch, etc.

As shown, interactive stylus 300 includes a stylus body 304, which may house various internal components, such as a controller 306. The internal components may further include drive circuitry for driving electrodes (308 and 310) and controlling other components in the interactive display device 302. It will be appreciated that various other circuitry and components may be provided within stylus body 304 to couple controller 306 to electrodes (308 and 310), as well as to other stylus components.

Interactive stylus 300 includes a first end 312 and a second end 314. In some example implementations, the first end 312 is an eraser end for providing both an erase function/mode and an application launch function/mode, while the second end 314 is an ink end for providing a drawing function/mode. In this way, the first end can be operated by a user to provide multiple functions, thereby expanding the functionality of the stylus 300. Consequently, interactive stylus 300 can be used to implement a wide array of interactive inputs to interactive display device 302.

Providing the erase function may include removing graphics such as lines, shapes, alphanumeric symbols, etc., presented on the display 324 responsive to movement of the stylus 300 close to or in contact with the display 324. It will be appreciated that a user may intuitively use the erase function, as it is analogous to the use of a conventional pencil. Furthermore, launching an application may include sending an application launch signal to the interactive display device 302. In response, the interactive display device 302 launches the application and displays associated graphical content of the application via a display 324 included in the display device 302. Although some of the examples herein refer to drawing, application launch, and erasing, the present discussion is applicable more generally to any two functions that are provided via the first end 312 of stylus 300 and a third function provided by the second end 314 of the stylus.

The first end 312 of stylus 300 includes electrode 308. The electrode 308 may be driven by controller 306 so as to capacitively couple the first end 312 with an electrode matrix 316 in display device 302. Electrode 310 may also be driven by controller 306. Driving electrodes (308 and 310) may include sending voltage pulses to the electrodes. The amplitude of the pulses sent to the electrode may of a relatively high value. Electrode matrix 316 may be similar to the electrode matrix 200, shown in FIG. 2.

Continuing with FIG. 3, the capacitive coupling of first end 312 with interactive display device 302 is associated with a first function, such as the erase function. As previously discussed the first end 312 can also be operated by a user to provide a second function, such as the application launch function. The second function (e.g., application launch function) can be disabled in response to automatically sensing, without explicit user input, a user's intent to use the first function (e.g., erase function). In this way, unwanted implementation of the second function during use of the first function may be avoided while providing a dual-function stylus end. And this can be avoided without the user having to explicitly disable the second function, for example by actuating a switch or button. As a result, stylus operation is improved through a reduction of unintended inputs, expanded stylus functionality, and increased input efficiency. The controller 306 along with one or more sensors may provide the automatic sensing functionality. The electrode 308 may be used as a sensor, in one example. Additionally, a communication device 330 included in the stylus 300 may also be used for sensing user intent to disable the second function, for example in cooperation with a corresponding communication device in interactive display device 302. The communication device 330 may be configured to receive signals such as radio signals, infrared signals, near field communication (NFC) signals, etc.

Automatic sensing, without explicit user input, of the user's intent to use the erase function may be based on proximity between portions of stylus 300 and display device 302, in one example. Specifically, automatically sensing of intent to use the erase function can include sensing that the first end 312 of the stylus 300 is proximate to or in contact with the display 324. For instance, a predetermined threshold proximity may be used in the automatic sensing of a user's intent to implement the erase function. In this way, intended use of the erase function is inferred when the erase end is close to or in contact with the display. As a result, a user's intent to use the erase function can be quickly and efficiently sensed.

Proximity may be automatically sensed based on the strength of a signal due to capacitive coupling between the stylus 300 and display device 302 (e.g., a strength of capacitance signal received at the stylus 300, or at the display device 302). Specifically, sensing may be performed based on capacitive coupling between electrode matrix 316 and electrode 308. In other words, automatically sensing that the first end 312 of the stylus 300 is proximate to or in contact with the display 324 may be based on the strength of the capacitive coupling between the first end 312 and the electrode matrix 316. In another example, a signal may be sent from the electrode 308 to the electrode matrix 316, via capacitive coupling, and a radio signal indicating the proximity of the stylus 300 to the display device 302 may be sent back to the stylus 300. In this example, the radio signal may be interpreted at the stylus 300 to trigger enablement or disablement of the erase function. Arrows 350 represent signals sent to the stylus 300 from the display device 302 and vice-versa. It will be appreciated that a number of techniques may be used to determine the proximity of the stylus 300 to the display device 302. In general, proximity and therefore intent may be based on one or more of (1) capacitive coupling due to excitation of electrodes in display device 302; (2) capacitive coupling due to excitation of an electrode in stylus 300; (3) radio-link communication between the stylus 300 and display device 302; and (4) optical detection.

As previously discussed, the second function of the first stylus end 312 may be a launch of an application on the interactive display device 302 or other suitable functions such as advancing a slide in an application. In one example, the launched application may be configured to enable creation and management of notes, drawings, screen clippings, and/or audio. However, numerous types of launched applications have been contemplated.

The interactive stylus 300 may further include a haptic actuator 318 positioned within the stylus body 304 (e.g., first end 312). Additional or alternative feedback mechanisms may be included in the interactive stylus such as an audio feedback mechanism (e.g., a speaker), a visual feedback mechanism (e.g., a light source), etc. The haptic actuator 318 may be associated with the second function and disabling the second function may include inhibiting operation of the haptic actuator, in another example. The haptic actuator may be enabled via implementation of the second function, thereby providing the user with tactile feedback associated with the second function. In this way, a user is provided with physical cues corresponding to the second function to enhance the user's interactive input experience. For example, the stylus 300 can cause a vibration to occur when the first end 312 is used to launch an application. Controller 306 is coupled to the haptic actuator 318 and configured to enable/disable operation of the haptic actuator.

The interactive stylus 300 may further include a mechanical actuator 320 (e.g., mechanical button) included in the first end 312 and associated with the second function. Actuation of the mechanical actuator 320 may trigger implementation of the second function (e.g., application launch function). In such an example, disabling the second function includes at least partially disabling the mechanical actuator 320. For instance, axial movement of the mechanical actuator 320 may be partially inhibited. Disabling the mechanical actuator may also include preventing the actuator from providing haptic feedback, such as a click. Still further in another example, the second function may include one or more of launch of an application by the interactive display device 302, generation of haptic feedback via the haptic actuator 318, and actuation of the mechanical actuator 320. Therefore, inhibiting operation of the second function can include inhibiting application launch, haptic feedback generation, and/or mechanical actuator operation. The stylus 300 may include another input actuator 322 (e.g., mechanical button) associated with yet another function, such as a drawing line weight function, another application launch function, etc. For example, the actuator 322 may change the weight of the line which is presented on the display 324 responsive to stylus input via the second end 314. Other uses may include, but are not limited to, a lasso select function and can vary by the application running on the interactive display device 302.

The electrode matrix 316 is coupled to the display 324. The interactive display device 302 further includes an interactive stylus module 326 configured to initiate disablement of the second function (e.g., application launch function) of the first end 312 of the stylus 300, in response to automatically sensing, without explicit user input, a user's intent to use the first function (e.g., erase function). The interactive stylus module 326 is coupled to display 324 and electrode matrix 316. Various circuitry, wires, etc., may be included in the interactive display device 302 to enable the coupling between display 324 and electrode matrix 316.

The interactive stylus module 326 can cause the second stylus function (e.g., erase function) to be disabled in various ways. In one example, the module 326 inhibits launching of an application at the interactive display device 302. In another example, the module 326 causes a signal to be sent to the interactive stylus 300 to trigger the stylus 300 to disable a haptic actuator in the interactive stylus 300. In yet another example, the signal sent from the module 326 triggers the stylus to disable operation of a mechanical actuator in the stylus (e.g., actuator 320 on first end 312). Disablement signals can be transmitted to the stylus 300 via capacitive coupling with electrodes, or via radio channel communications received at communication device 330, for example.

The interactive stylus module 326 may be further configured to automatically sense, without explicit user input, if the second end 314 is proximate to or in contact with the display 324. In response, a drawing mode can be automatically implemented at second end 314. Similar to proximity detection for first end 312, proximity detection of second end 314 may be sensed via strength of capacitive coupling (i.e., between electrode 310 and electrode matrix 316), potentially in conjunction with radio-link communication between the stylus 300 and display device 302.

Figure 4:
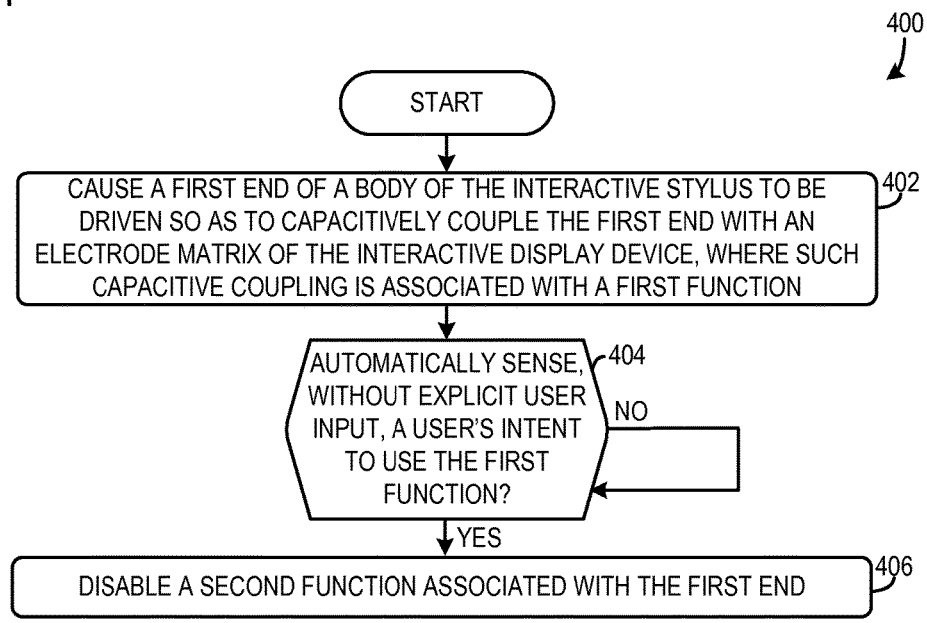
FIG. 4 shows a method for operation of an interactive stylus.

FIG. 4 shows a method 400 for operating an interactive stylus 300. The method 400 may be implemented through operation of the interactive styluses discussed above with regard to FIGS. 1-3 or may be implemented via other suitable interactive styluses.

The method includes, at step 402, causing a first end of a body of the interactive stylus 300 to be driven so as to capacitively couple the first end with an electrode matrix 316 of the interactive display device 302. The capacitive coupling is associated with a first function, such as an erase mode of the stylus 300. It will be appreciated that the first end can include an electrode to perform the capacitive coupling, as previously discussed.

As discussed above, the stylus 300 can be operated other than to provide the first function referred to in step 402. Instead of erasing, the erase end may be away from the display 324, for example when an opposing end of the stylus 300 is used for writing. Also, a second function may be invoked at the erase end, which may include the aforementioned haptic, button and application launch features, as examples. Accordingly, the method includes automatically discerning when the erase function is being used, for example, so that the alternate second function can be disabled.

This is specifically shown at step 404, where the method automatically senses if a user intends to use the first function, without explicit user input. As discussed above, this automatic sensing may be based on the strength of the capacitive coupling between a first electrode 310 included in the first end 314 and a second electrode included in the electrode matrix 316. It will be appreciated that the capacitive coupling strength may be used to infer the first end's proximity to the display device 302. As indicated, step 404 may be performed more or less continuously while intent to use the first function is not sensed. This can correspond, for example, to when the stylus 300 is used in a writing mode or otherwise is in a state in which the user would want to use the second function of the stylus end (e.g., use for application launch and not erase).

When a user's intent to use the first function is automatically sensed, the second function associated with the first end is disabled at step 406. In this way, undesired triggering/ use of the second function during use of the first function is prevented, to provide improved operation and a better user experience. As in the above examples, disabling the second function can include inhibiting application launch on the interactive display 324 or inhibiting a haptic feedback generation in the interactive stylus 300. In such an example, the haptic feedback generation can include generating vibrations via a haptic actuator and/or depression of a mechanical actuator. Once the first function is no longer being used, the method may proceed to place the stylus 300 back into a state in which the second function is again enabled.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
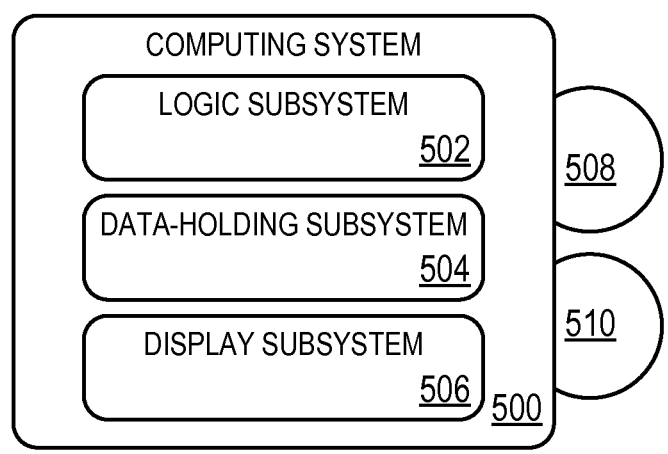
FIG. 5 schematically shows a non-limiting embodiment of a computing system 500.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 502 and a storage machine 504. Computing system 500 may optionally include a display subsystem 506, communication subsystem 508, input subsystem 510, and/or other components not shown in FIG. 5. The logic machine 502 and storage machine 504 may be included in the interactive display devices (102 and 302), described above. Specifically, the logic machine and storage machine may provide the functionality of the interactive stylus module 326. Therefore, the logic machine and storage machine may be configured to initiate disablement of the second function of the first end of the stylus in response to automatically sensing, without explicit user input, a user's intent to use the first function.

The logic machine and storage machine may also be configured to automatically sense, without explicit user input, if a second end is proximate to or in contact with the display and in response to automatically sensing that the second end is proximate to or in contact with the display implement a drawing mode. Additionally, display subsystem 506, communication subsystem 508, and input subsystem 510 may be included in the display devices described above.

Furthermore, the communication device 330, shown in FIG. 3 and discussed above, may have similar functional characteristics to the communication subsystem 508, described below. The controller 306, shown in FIG. 6 and discussed above, may also include a logic machine and storage machine similar in functionality to logic machine 502 and storage machine 504. However, in other examples, the controller may be a configured to control a discrete circuit.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 508 may be configured to communicatively couple computing system 500 with one or more other computing devices. Communication subsystem 508 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The subject matter of the present disclosure is further described in the following paragraphs. According to one aspect, an interactive stylus for use with an interactive display device is provided. The interactive stylus includes a stylus body having a first end, where the first end is configured to be operated by a user to provide a first function and a second function; and a controller configured to cause the first end to be driven so as to capacitively couple the first end with an electrode matrix of the interactive display device, where such capacitive coupling is associated with the first function, and where the second function is disabled in response to automatically sensing, without explicit user input, a user's intent to use the first function.

In this aspect, the interactive stylus may further include a haptic actuator included in the stylus body and associated with the second function and where disabling the second function includes inhibiting operation of the haptic actuator.

In this aspect, the second function may be a launch of an application on the interactive display device, such launching function being disabled in response to automatically sensing, without explicit user input, a user's intent to use the first function.

In this aspect, the interactive stylus may further include a mechanical actuator associated with the second function and where operation of the mechanical actuator is at least partly disabled in response to automatically sensing, without explicit user input, a user's intent to use the first function.

In this aspect, the first function may be an erase mode in which the first end is capacitively coupled with the electrode matrix to provide an erase function in the interactive display device.

In this aspect, the stylus body may further include a second end configured to provide a drawing mode.

In this aspect, automatically sensing the user's intent to use the first function may be based on a proximity of the interactive stylus to the interactive display device.

In this aspect, the proximity may be sensed based on a strength of a signal due to capacitive coupling between the interactive display device and the interactive stylus.

According to another aspect, an interactive display device for use with an interactive stylus is provided. The interact display device includes a display configured to present graphical content; an electrode matrix coupled to the display and configured to capacitively couple with an electrode in a first end of the interactive stylus, the capacitive coupling associated with a first function of the first end; and an interactive stylus module configured to initiate disablement of a second function of the first end in response to automatically sensing, without explicit user input, a user's intent to use the first function.

In this aspect, initiating disablement of the second function may include inhibiting launch of an application on the interactive display device.

In this aspect, initiating disablement of the second function may include sending a signal to the interactive stylus to disable a haptic actuator in the interactive stylus.

In this aspect, initiating disablement of the second function may include sending a signal to the interactive stylus to at least partly disable operation of a mechanical actuator included in the first end.

In this aspect, automatically sensing, without explicit user input, a user's intent to use a first function may include sensing that the first end of the interactive stylus is proximate to or in contact with the display.

In this aspect, sensing that the first end of the interactive stylus is proximate to or in contact with the display may be based on a strength of a signal due to capacitive coupling between the first end and the electrode matrix.

In this aspect, the first function may be an erase mode in which the first end is capacitively coupled with the electrode matrix to provide an erase function in the interactive display device.

In this aspect, the interactive stylus module may be configured to automatically sense, without explicit user input, if a second end of the interactive stylus is proximate to or in contact with the display and in response implement a drawing mode of the second end.

According to another aspect, a method for operating an interactive stylus for use with an interactive display device is provided. The method includes causing a first end of a body of the interactive stylus to be driven so as to capacitively couple the first end with an electrode matrix of the interactive display device, where such capacitive coupling is associated with a first function; and disabling a second function associated with the first end in response to automatically sensing, without explicit user input, a user's intent to use the first function.

In this aspect, disabling the second function may include inhibiting application launch on the interactive display device or inhibiting a haptic feedback generation in the interactive stylus.

In this aspect, the haptic feedback generation may include at least one of generating vibrations via a haptic actuator and depression of a mechanical actuator.

In this aspect, automatically sensing, without explicit user input, a user's intent to use the first function may be based on a strength of signal due to capacitive coupling between a first electrode included in the first end and a second electrode included in the electrode matrix.

The invention claimed is:

1. An interactive stylus for use with an interactive display device, comprising:
    a stylus body having a first end, where the first end is configured to be operated by a user to provide a first function and a second function; and
    a controller positioned within the stylus body and configured to electrically drive the first end through drive circuitry so as to capacitively couple the first end with an electrode matrix of the interactive display device, where such capacitive coupling is associated with the first function and not with the second function, and where the second function is disabled by the controller in response to automatically sensing a user's intent to use the first function without explicit user input to prevent unwanted simultaneous implementation of the first and second functions, and where disabling the second function includes at least one of sending instructions to the interactive display device to prevent implementation of the second function via processing of such instructions with a processor of the interactive display device and receiving instructions from the interactive display device to prevent implementation of the second function via processing of such instructions with the controller.

2. The interactive stylus of claim 1, further comprising a haptic actuator included in the stylus body and associated with the second function and where disabling the second function includes inhibiting operation of the haptic actuator.

3. The interactive stylus of claim 2, where the actuator is a mechanical actuator associated with the second function and where operation of the mechanical actuator is at least partly disabled in response to automatically sensing a user's intent to use the first function.

4. The interactive stylus of claim 1, where the second function is a launch of an application on the interactive display device, such launching function being disabled in response to automatically sensing a user's intent to use the first function.

5. The interactive stylus of claim 1, where the first function is an erase mode in which the first end is capacitively coupled with the electrode matrix to provide an erase function in the interactive display device.

6. The interactive stylus of claim 1, where the stylus body further includes a second end configured to provide a drawing mode.

7. The interactive stylus of claim 1, where automatically sensing the user's intent to use the first function is based on a proximity of the interactive stylus to the interactive display device.

8. The interactive stylus of claim 7, where the proximity is sensed based on a strength of a signal due to capacitive coupling between the interactive display device and the interactive stylus.

9. An interactive display device for use with an interactive stylus, comprising:
a display configured to present graphical content;
an electrode matrix coupled to the display and configured to capacitively couple with an electrically driven electrode in a first end of the interactive stylus, the capacitive coupling associated with a first function of the first end; and
an interactive stylus module configured to initiate disablement of a second function of the first end, the capacitive coupling being associated with the first function and not with the second function, the disablement being produced through electronic communication with a controller positioned within a stylus body of the interactive stylus in response to automatically sensing a user's intent to use the first function without explicit user input in order to prevent unwanted simultaneous implementation of the first and second functions, where disabling the second function includes at least one of sending instructions to the interactive stylus to prevent implementation of the second function via processing of such instructions with the controller of the interactive stylus and receiving instructions from the interactive stylus to prevent implementation of the second function via processing of such instructions with a processor of the interactive display device.

10. The interactive display device of claim 9, where initiating disablement of the second function includes inhibiting launch of an application on the interactive display device.

11. The interactive display device of claim 9, where the interactive stylus includes a haptic actuator within the first end of the stylus body and where initiating disablement of the second function includes sending a signal to the interactive stylus to disable the haptic actuator in the interactive stylus.

12. The interactive display device of claim 9, where the interactive stylus includes a mechanical actuator within the first end of the stylus body and where initiating disablement of the second function includes sending a signal to the interactive stylus to at least partly disable operation of the mechanical actuator included in the first end.

13. The interactive display device of claim 9, where automatically sensing the user's intent to use the first function includes sensing that the first end of the interactive stylus is proximate to or in contact with the display.

14. The interactive display device of claim 13, where sensing that the first end of the interactive stylus is proximate to or in contact with the display is based on a strength of a signal due to capacitive coupling between the first end and the electrode matrix.

15. The interactive display device of claim 9, where the first function is an erase mode in which the first end is capacitively coupled with the electrode matrix to provide an erase function in the interactive display device.

16. The interactive display device of claim 9, where the interactive stylus module is configured to automatically sense if a second end of the interactive stylus is proximate to or in contact with the display and in response implement a drawing mode of the second end.

17. A method for operating an interactive stylus for use with an interactive display device comprising:
at a controller positioned within a stylus body of the interactive stylus, electrically driving an eraser end of the stylus body through drive circuitry so as to capacitively couple the eraser end with an electrode matrix of the interactive display device, where such capacitive coupling is associated with an erase function and not with a second function, the erase function configured to remove graphics from the interactive display device; and
disabling the second function associated with the eraser end in response to automatically sensing a user's intent to use the erase function to prevent unwanted simultaneous implementation of the erase and second functions, where disabling the second function includes at least one of sending instructions to the interactive stylus to prevent implementation of the second function via processing of such instructions with the controller of the interactive stylus and receiving instructions from the interactive stylus to prevent implementation of the second function via processing of such instructions with a processor of the interactive display device.

18. The method of claim 17, where disabling the second function includes inhibiting application launch on the interactive display device or inhibiting a haptic feedback generation in the interactive stylus.

19. The method of claim 18, where the haptic feedback generation includes at least one of generating vibrations via a haptic actuator and depression of a mechanical actuator.

20. The method of claim 17, where automatically sensing the user's intent to use the erase function is based on a strength of signal due to capacitive coupling between a first electrode included in the eraser end and a second electrode included in the electrode matrix.

* * * * *